No. 852,281. PATENTED APR. 30, 1907.
J. H. MILBURN.
SCALE.
APPLICATION FILED JAN. 22, 1906.
2 SHEETS—SHEET 2.
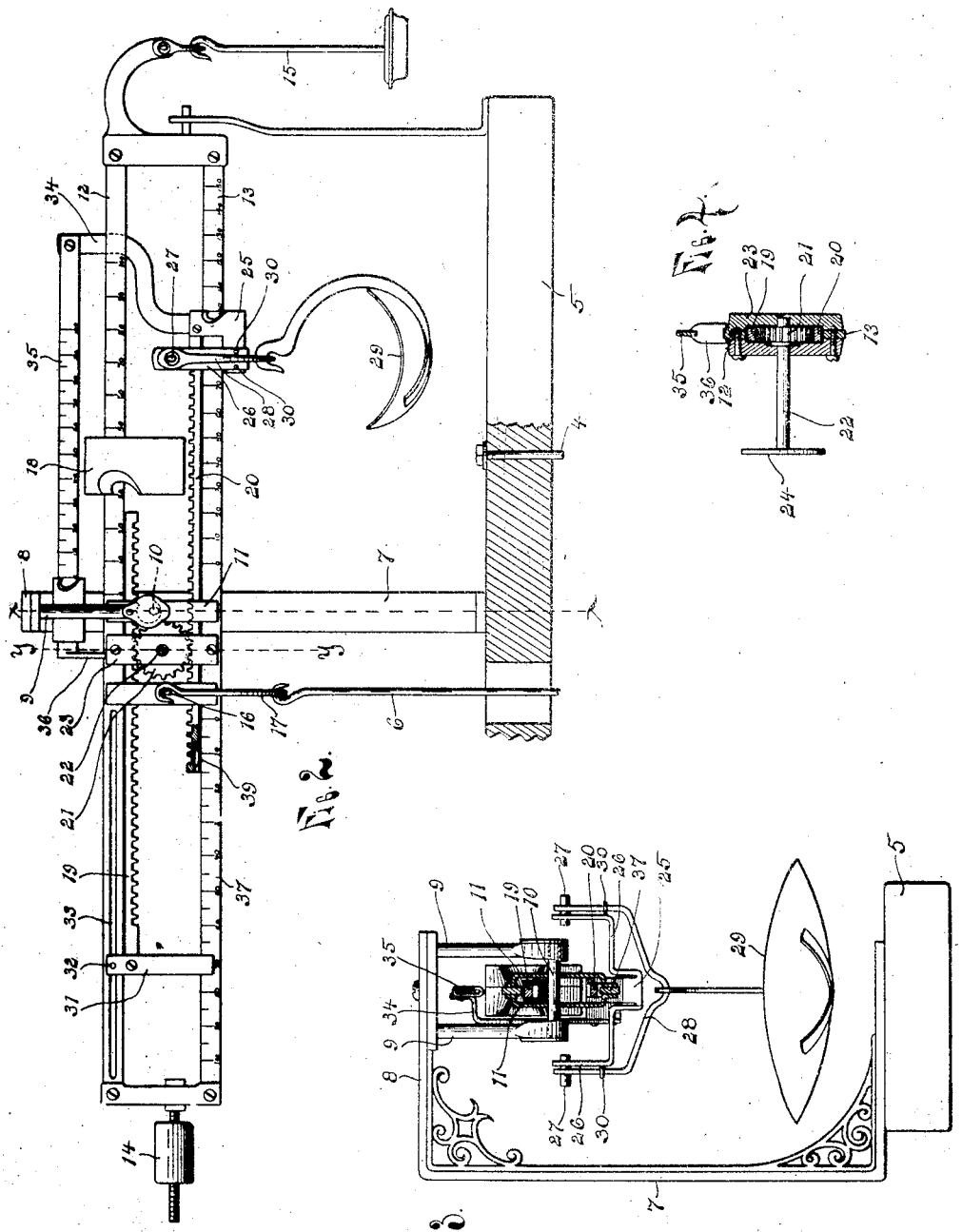
WITNESSES:
INVENTOR.
John H. Milburn,
BY
ATTORNEYS

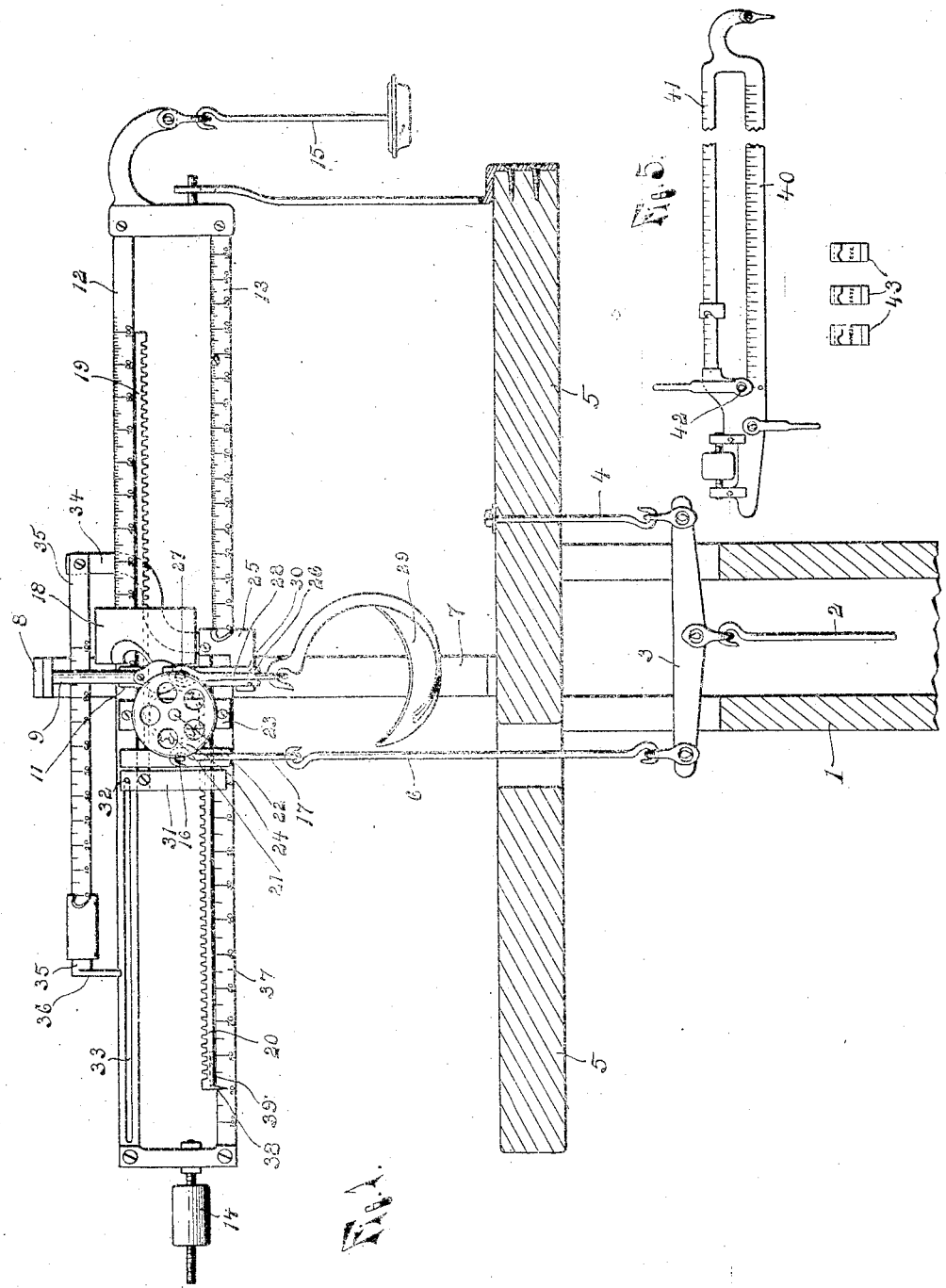

UNITED STATES PATENT OFFICE.

JOHN H. MILBURN, OF DETROIT, MICHIGAN.

SCALE.

No. 852,281.  Specification of Letters Patent.  Patented April 30, 1907.

Application filed January 22, 1906. Serial No. 297,153.

*To all whom it may concern:*

Be it known that I, JOHN H. MILBURN, a citizen of the United States of America, residing at Detroit, in the county of Wayne and State of Michigan, have invented certain new and useful Improvements in Scales, of which the following is a specification, reference being had therein to the accompanying drawings.

This invention relates to a scale for ascertaining and indicating the number of units or articles in a quantity, bulk or mass of like units, and the object of the invention is to provide an efficient device for the purpose which is simple in its construction and may be quickly and conveniently operated.

It is also an object of the invention to so construct the same as to adapt it to be combined with a weighing beam and to also serve, by the addition of a value beam, as a computing scale.

To this end the invention consists in providing a beam so constructed that the neutral or zero point thereon at which a weight or article may be placed without affecting the balance of the beam, is in the vertical plane of the supporting pivot of said beam, and therefore articles of various weights may be placed upon the beam and the relation of the weight of the one so placed to the weight on the platform of the scale will be indicated on the beam; that is, the number of times which the weight of the article on the beam is contained in the bulk on the platform will be indicated, and where the article so placed is of the same weight or is exactly like those on the platform, the number of articles on the platform will be indicated on the beam.

The invention also consists in providing such a beam with a carrier for supporting and moving articles or weights along the beam, the weight of which carrier is eliminated by an oppositely moving counterweight, and in providing means for simultaneously moving said carrier and weight in opposite directions.

The invention further consists in so attaching a value bar to said carrier that when the carrier is moved, the value bar will be moved also, thus changing its relation to the pivot bearings so that the distance which its counter poise must be moved to balance the beam will be increased in proportion to the distance which said value bar is moved, and the invention also consists in the particular arrangement, construction and combination of parts whereby a very simple construction is secured in which are combined counting or proportioning, weighing and computing mechanisms, all as hereinafter more fully described, reference being had to the accompanying drawings, in which Figure 1, is a side elevation of the head or balance and lever mechanism of a platform scale embodying the invention, the shelf and the upper end of the pedestal or column being shown in section; Fig. 2, is a similar view of the same showing the parts in a shifted position to illustrate their operation and parts broken away to show the construction; Fig. 3, is a cross-section on the line x—x of Fig. 2; Fig. 4, a similar section on the line y—y of said Fig. 2 looking in the opposite direction, and Fig. 5, a detail illustrating a modified construction.

As shown in the drawings 1 represents the upper end of a hollow column or pedestal of a platform weighing scale as ordinarily constructed with platform and platform levers (not shown), to the extension arm of which levers is attached the lower end of a pull rod 2 extending downward within the column. The upper end of said rod 2 is attached to a draft bar 3 intermediate the ends thereof, one end of said bar being supported by a fixed rod 4 secured to the horizontal shelf 5 secured to the upper end of the column and to the opposite end of said bar is pivotally attached the connecting rod 6 extending upward through an opening in the shelf.

Secured to the shelf 5 is an upwardly extending supporting bracket 7 and to the horizontally and forwardly extending upper end or arm 8 of said bracket are secured two downwardly extending hangers 9 each provided with a hardened bearing seat to receive the ends of the knife-edge bearing pin 10 extending through and rigidly secured to cross-connecting pieces 11 connecting the two parallel bearings 12 and 13 at approximately half way between their ends. The beams are connected at their ends and provided at the rear end with the usual balance weight 14 and at the forward end with the ordinary swinging counter-poise balance 15. At a short distance to the rear of the pivot 10, the beams are connected by cross-connecting pieces carrying the knife edge pivot pin 16 engaged by the loop 17 to which the upper end of the connecting rod 6 is attached.

The forward end of the upper beam 12 is formed with graduation marks and provided with a sliding poise block 18, thus forming the weight beam upon which the weight of an article placed on the platform may be ascertained in the usual manner, extra counter-poises being placed on the balance poise 15 when required.

Directly beneath the lower edge of the upper beam 12 is supported a longitudinally movable rack bar 19 and a similar rack bar 20 is movable longitudinally upon the upper edge of the lower beam 13. These racks are moved simultaneously in opposite directions by a gear 21 interposed between the racks and secured upon a shaft 22 mounted in bearing members 23 extending across between the beams on each side of the gear and at a short distance to one side of the bearing 10. The shaft is turned by means of a hand wheel 24 on its extended end.

Attached to the forward end of the lower rack bar 20 is a carrier block 25 slidable upon the beam 13 and secured to a rearwardly extending portion of said block are two laterally and upwardly extending supporting arms 26 provided with knife edge bearing pins 27 at their upper ends to pivotally support a loop 28 upon which is hung a small scoop or pan 29 or similar receptacle. Small pins or projections 30 on each of said arms 26, extend outward at each side of the loop to prevent its swinging too far when the rack is moved quickly but far enough from the loop to permit it to hang free.

To the rear end of the upper rack bar 12 is attached a counter-weight 31 which is made heavy enough to counter-balance the carrier block 25 and scoop, and this weight is guided and supported by a pin 32 on its upper end extending through a longitudinal slot 33 in the rear half of the upper beam.

The block 25 is provided with a forwardly and upwardly extending rigid arm 34 to the upper end of which is attached a value bar or beam 35 which is supported at its rear end by a leg 36 having a notch to engage the upper edge of the upper beam and slide thereon; and the rear half 37 of the lower beam is provided with graduation marks to form the price-per-pound bar, a pointer 38 being secured to the extreme rear end of the rack bar 20 so that said racks may be accurately shifted according to the markings on said price bar, to move the value bar the required distance.

Within a groove in the lower edge of the lower rack bar at its rear end, is placed a flat steel spring 39 which rides upon the upper edge of the price bar and yieldingly holds the rack in proper engagement with its gear to take up any lost motion caused by wear. The upper rack is held by gravity in close mesh with the gear for the same purpose.

The parts being constructed and arranged as described, the device is designed to operate as follows: The operator having a large quantity of like articles which he wishes to count as for instance a lot of bolts all of the same size, he places in the pan 29 one of the bolts or its exact equivalent in weight, and on the platform throws the remainder of the lot, then turning the hand wheel, he moves the carrier block along the number bar until the beam balances. The number indicated by the block on the bar will be the number of bolts on the platform, as the leverage is so arranged that when the pan is moved to any particular indicating mark, as 100, (as shown in Fig. 2,) the weight of the one bolt in the pan will balance that number, or one hundred bolts, on the platform, the weight of the pan, carrier block, etc., being eliminated by the traveling weight 31.

The total weight of the articles placed on the platform may be ascertained by moving the sliding poise on the weighing beam until the beam balances, the weight of the bolt or other article in the scoop being eliminated by removing it therefrom or by moving the racks back to "0" as shown in Fig. 1, the pivots 27, of the pan being thus brought directly in horizontal and vertical alinement with the beam pivot 10.

When the scale is used as a computing scale, any article which may be in the scoop or pan is removed and the racks moved until the pointer 38 indicates the desired price per pound. The article or material to be weighed is then placed on the platform and the poise on the value bar moved until the beam balances, thus indicating the value of the articles at the indicated price per pound. Should the value be more than one dollar, the highest amount indicated on the value bar, a counter-poise representing one or more dollars in value may be placed in the pan and the odd cents indicated on the value bar.

In Fig. 5 is shown a construction especially adapted for grain scales, the lower beam 40 being the "bushels" beam and the upper beam 41 the pounds or weighing beam. No poises or weights whatever are attached to the lower beam and its neutral or zero point is therefore coincident with its supporting pivot 42, as indicated by the markings or scale on the beam. A number of detachable poises 43 each representing one bushel of a certain kind of grain, are provided, which poises may be quickly and easily placed on the beam, and the number indicated by said poise on said beam when it comes to a balance will be the number of bushels of that particular kind of grain in the hopper of the scale as said poises are of such a weight that when placed on the beam at "1" it will just balance one bushel of the particular kind of grain which is represents.

Should there be in the hopper a few pounds more than are even number of bushels, the bushels may be indicated on the lower beam and the odd number of pounds on the upper or weighing beam, thus showing the operator at a glance exactly what he wishes to know, i. e. the number of even bushels and pounds over, contained in the hopper.

Having thus fully described my invention, what I claim is:—

1. The combination with a pivoted beam, of carrying means movable along said beam, a counter-balance, means for moving the carrying means and counter-balance simultaneously in opposite directions to maintain the balance of the beam, a value bar attached to and movable with the carrying means, a counter-poise slidable on the value bar, and price-per-pound indicating means movable with and proportionately to the value bar.

2. The combination of a beam pivoted intermediate its ends and having price-per-pound markings at one end and markings indicating quantity in numbers at the opposite end, a carrier adapted to receive and carry an article slidable on the end of said beam having the number markings toward and from its pivot, a value bar attached to and movable with said carrier, a counter-poise on said value bar, a counter-balance, means for simultaneously moving the counter balance and carrier in opposite directions from and toward the pivot of the beam, and means attached to the carrier and movable along the beam adjacent to the price-per-pound markings.

3. The combination of a double beam consisting of a weight beam and a number beam, a counter-poise on the weight beam, a carrier block for supporting an article slidable upon the number beam, a counter-weight, means for moving the counter-weight and carrier block simultaneously in opposite directions, a value bar attached to and movable with the carrier block, a counter-poise on said value bar, and means attached to the carrier block and movable therewith to indicate on the beam the price per pound.

4. The combination of a beam pivotally supported intermediate its ends and provided with markings at one side of its pivot representing quantity in number and at the other side of its pivot with markings representing prices-per-pound, a carrier slidable on said beam, a value bar attached to and movable with said carrier, a counter-poise on said bar, a counter-balance-weight for balancing the weight of said carrier, and means attached to the carrier for moving the same which serves to indicate on the price-per-pound markings the desired price.

5. The combination of a beam pivotally supported intermediate its ends and provided with markings at one side of its pivot representing quantity in number and at the other side of its pivot with markings representing prices-per-pound, a carrier slidable on said beam for supporting an article, a rack attached at one end to said carrier and movable longitudinally of the bar with its opposite end adjacent to the price-per-pound markings, a value bar attached to and movable with the carrier, a counter-poise on said bar, a counter-balance-weight, a rack-bar attached to said counter-balance-weight and adapted to move longitudinally in parallelism with the other rack-bar at a distance therefrom, and means interposed between said racks to move the same simultaneously in opposite directions.

6. The combination of a double beam consisting of an upper weighing beam and a lower number beam, a carrier block for supporting an article slidable upon the number beam, a rack-bar attached to said carrier and slidable longitudinally upon the upper edge of said number beam, a counter-balance-weight guided and supported by the weighing beam, a rack-bar attached to said counter-balance-weight and extending longitudinally of and adjacent to the lower edge of said weighing beam, bearing members connecting said beams, a shaft mounted in said bearing members, a gear on said shaft engaged at each side by said rack bars, and a hand wheel on said shaft.

7. The combination of a weighing beam and a number beam connected at their ends to form a double beam pivotally supported intermediate its ends, a block slidable on the number beam, a rack-bar pivotally attached at one end to said block and slidable upon the upper edge of the number beam, a counter-balance-weight guided and supported between said beams, a rack-bar pivotally attached at one end to said counter-balance-weight and movable longitudinally adjacent to the lower edge of the weighing beam, bearing members connecting the beams adjacent to their supporting pivot, a shaft mounted in said members, a gear on said shaft between the rack-bars, and a spring interposed between the lower rack bar and the upper edge of the number beam to hold said rack in close mesh with the gear.

8. The combination with a weighing beam, of a number beam extending parallel with the weighing beam and connected thereto at each end, a carrier block slidable on the number beam, a pan pivotally supported by said block, a rack-bar attached to said block and slidable longitudinally of the number beam, a counter-balance-weight supported by the weighing beam, a rack-bar attached to said counter-balance-weight and extending adjacent to the lower edge of the weighing beam, a gear interposed between said racks to actuate the same in opposite directions, an upwardly extending arm on the carrier block, a value bar attached at one end to said arm and resting at its opposite end upon the upper edge of the weighing beam to slide thereon, and a counter-poise on said bar.

9. The combination with a supporting bracket, of hangers on said bracket formed with bearing seats at their lower ends, an upper weighing beam formed with a longitudinal slot at one end, a lower number beam connected at each end to the weighing beam, connecting members connecting said beams intermediate their ends, a bearing pin secured to said members and engaging the bearing seats to support the beams, a carrying block slidable on the number beam, a loop pivotally attached to said block, a pan attached to said loop, a rack-bar pivotally attached to said block and slidable on the upper edge of the number bar, a counter-balance-weight having a pin extending through the slot in the weighing bar, a rack-bar attached to said counter-balance-weight, bearing members connecting the beams adjacent to their pivot, a shaft mounted in said members, a gear on said shaft to engage the racks, and a hand wheel on the shaft to turn the same.

10. The combination with a supporting bracket, of parallel hangers on said bracket formed with bearing seats at their lower ends, a double beam consisting of an upper weighing beam and a lower number beam connected at their ends, members connecting said beams near their center, a transverse pin secured to said members between the beams to engage the bearings on the hangers and support the beams, a carrier block on the number beam having a rearward extension, laterally and upwardly extending arms on said extension, bearing pins on the ends of said arms, a loop engaging said pins, a pan supported by said loop, a counter-balance-weight slidable longitudinally of said beams, rack-bars attached to said carrier block and counter-balance-weight to move the same, a gear journaled between the beams to engage the racks and move the same in opposite directions to move the block to bring the supporting arms into vertical alinement with the beam pivot, said bearing pins on said arms being substantially in the horizontal plane of said beam pivot.

11. The combination of a pivotally supported beam the neutral or zero point of which is in the vertical plane of its supporting pivot and provided with markings at one side of its pivot representing quantity in number and price-per-pound markings at the opposite side of its pivot, a carrier to support and move an article along the beam and indicate the number of units of the unit markings, a value bar movable with said carrier, and means for indicating on the price-per-pound markings the distance which the value bar is moved.

12. The combination of a double beam consisting of an upper weight and a lower number beam, a pivot for said beam which is coincident with the neutral or zero point of the number beam, a counter-poise on the weight beam, a carrier adapted to be moved along the number beam and to support an article in vertical alinement with said pivot, a counter-balance, members slidable on said beams for moving the carrier and counter-balance simultaneously in opposite directions, a pointer on one of said members to indicate upon one of the beams the price per pound, and a value bar attached to the carrier and movable with the member having the pointer.

In testimony whereof I affix my signature in presence of two witnesses.

JOHN H. MILBURN.

Witnesses:
OTTO F. BARTHEL,
THOS. G. LONGSTAFF.